Oct. 14, 1930.   R. P. LANSING   1,778,458
ENGINE STARTER
Filed July 6, 1925   3 Sheets-Sheet 1

Oct. 14, 1930.  R. P. LANSING  1,778,458
ENGINE STARTER
Filed July 6, 1925  3 Sheets-Sheet 2
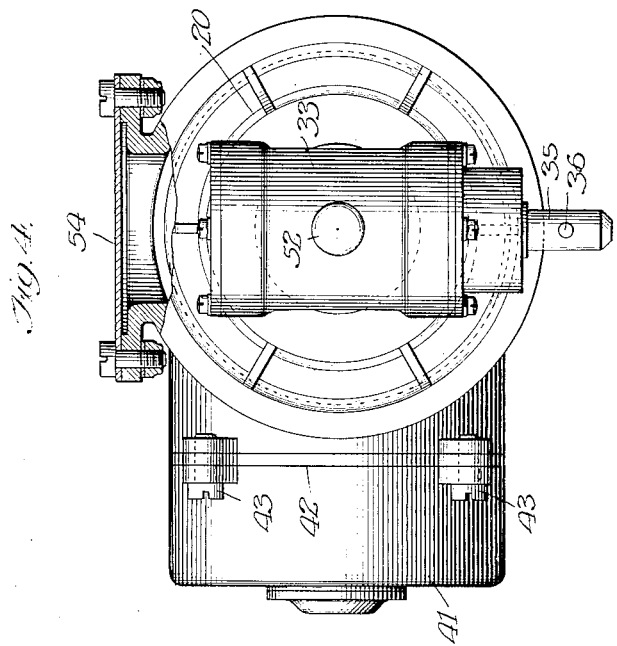
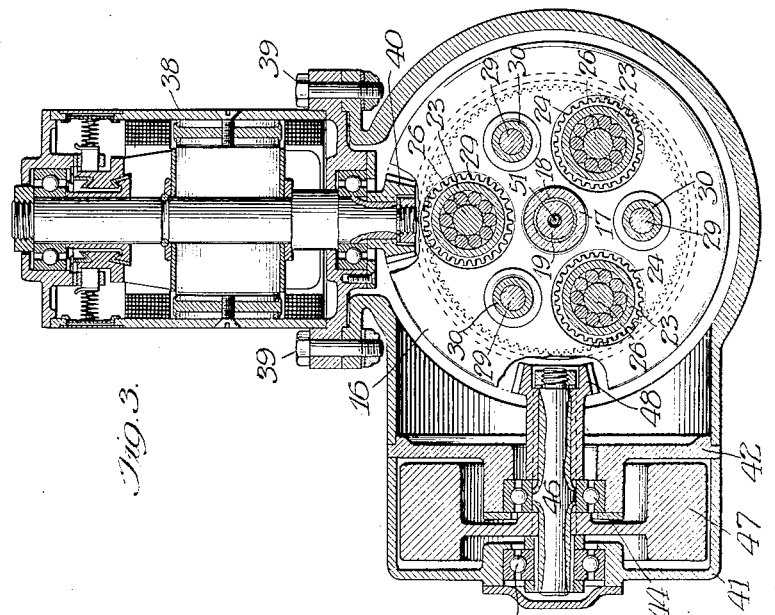
Witness
Martin H. Olsen.
Inventor
Raymond P. Lansing
By Rector, Hibben, Davis & Macauley
His Attys

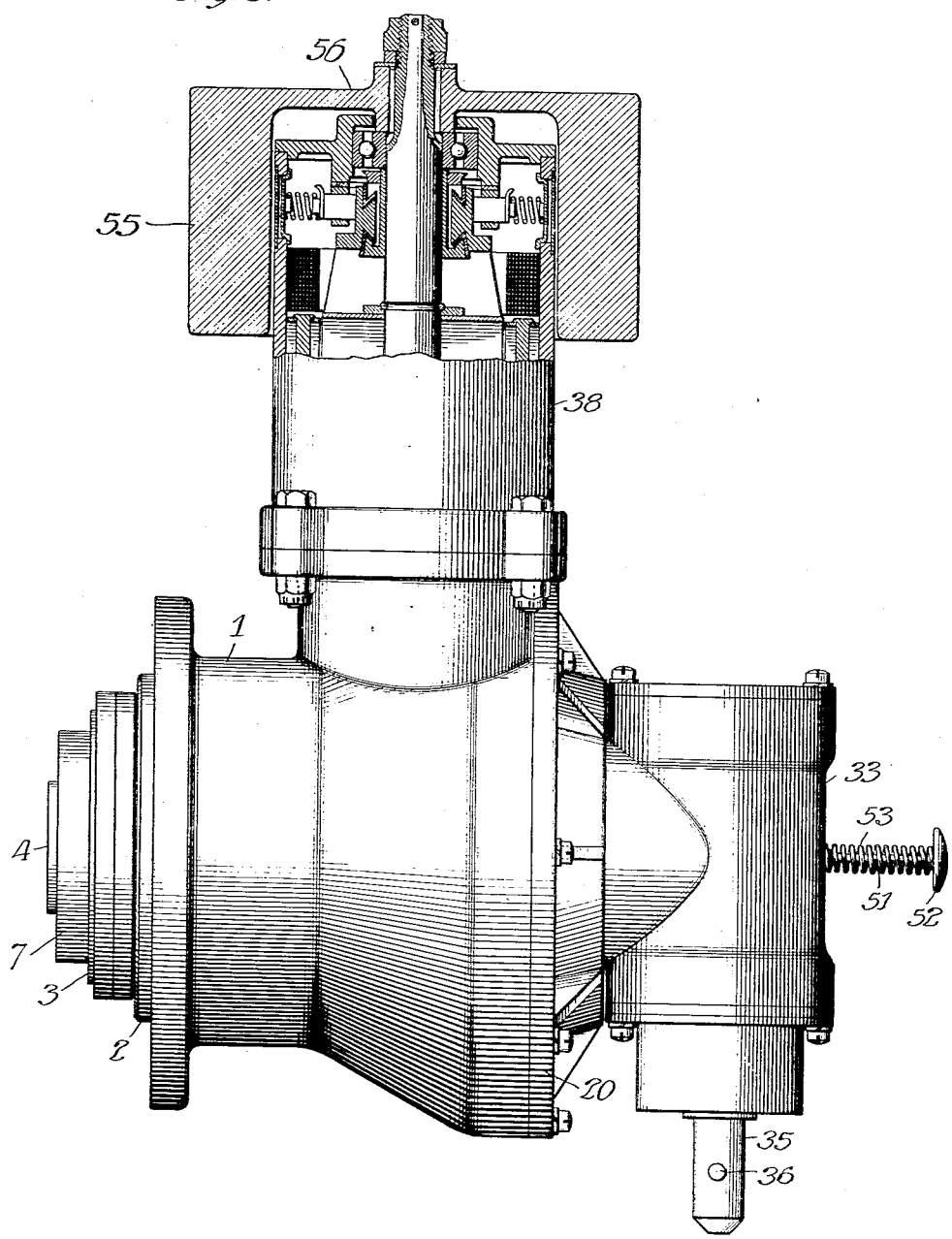

Patented Oct. 14, 1930

1,778,458

UNITED STATES PATENT OFFICE

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK

ENGINE STARTER

Application filed July 6, 1925. Serial No. 41,824.

My invention relates to engine starters for the starting of engines, such as internal combustion engines, and more particularly, but not necessarily, airplane engines and the object thereof is to provide a simple, efficient and reliable apparatus for either manual or power operation, or both, and characterized by the provision of inertia means which are actuated by such power means or manual means, and then utilized by the application of the inertia to the engine for starting or cranking the same. The various features of advantage and utility in engine starters will be apparent from the description hereinafter given.

Figure 1:
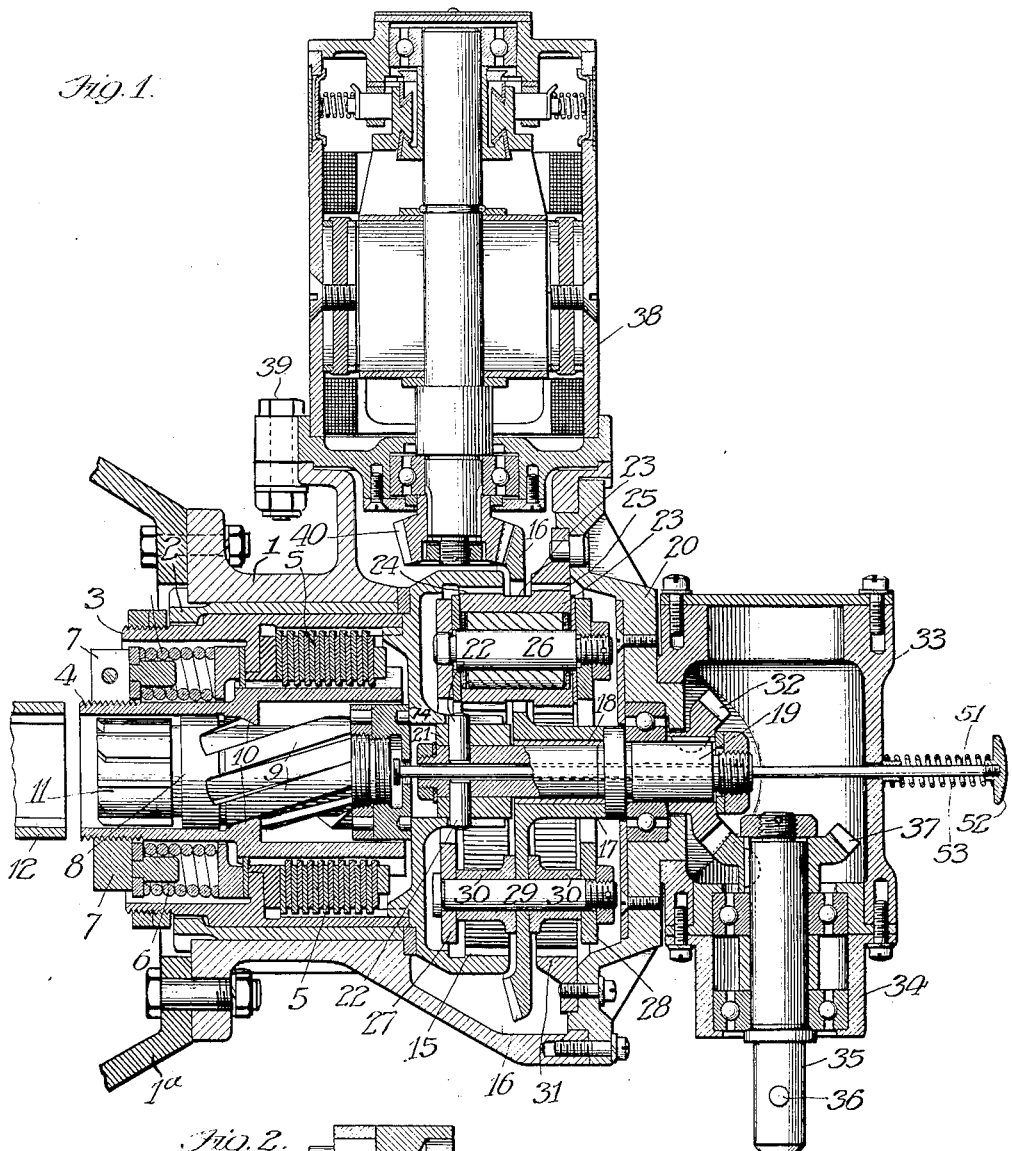
Figure 2:
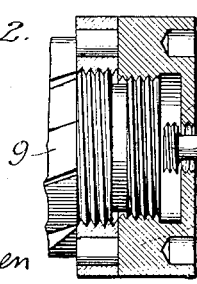

In the drawings, Fig. 1 is a sectional elevation of my engine starting apparatus; Fig. 2 an enlarged detail view of the push rod and nut at end of the drive shaft; Fig. 3 a sectional elevation at right angles to the section of Fig. 1; Fig. 4 an elevation partly in section of the parts shown in Fig. 3 but with the motor removed and a cover plate attached; and Fig. 5 an elevation partly in section of a modified form of apparatus.

The particular construction of the drive or transmission for engagement with and disengagement from the engine, as well as the reduction gearing between it and the manually operated means and between it and the prime mover, such as an electric motor, is immaterial and, therefore, any suitable transmission and reduction gearing may be employed. However, I prefer the particular transmission and reduction gearing herein shown as suitable and practicable.

First describing the drive or transmission, the same is located within a main casing 1 which is suitably supported as by being detachably connected with the crank case 1ª of the engine. Within a bushing 2 in the casing there rotates a barrel 3 and a shell 4 concentrically arranged therewithin and providing a considerable annular space between them to receive a yieldable driving connection which is here in the form of a friction clutch 5. The sets of clutch plates are splined respectively to the interior of the barrel and the exterior of the shell. The proper pressure is provided for the plates by a series of springs 6 located in such annular space and such pressure is regulated by the adjustable nut 7. Within the shell 4, there is mounted a screw shaft 8 having long lead threads 9 which are threaded to the internally threaded or nut portion 10 of the shell. This shaft is provided at its outer end with a driving member which is here in the form of a splined member or part 11 adapted when moved longitudinally to engage a rotatable member of the engine to be started which latter member is here the engine crank shaft 12 provided with internal splines.

When the barrel is rotated, such rotation is imparted to the shell 4 through the clutch so that when the shaft 8 is moved outwardly to the left in Fig. 1 and the spline portion 11 thereof is engaged with the engine member in the manner hereinafter explained, the torque is transmitted from the shell 4, through the threads 9 and 10 and shaft 8 and splines 11 to the engine crank shaft 12. The engine is thereupon cranked. When the engine starts on its own power, the shaft 8 is automatically demeshed and the same is restored to normal position as shown in Fig. 1, at which time the abutment nut 13 contacts the face 14 of the main drive wheel 15 of the apparatus.

Next describing the planetary reduction, the same, in practice and as herein shown, has a reduction of 23 to 1, that is, that it is necessary to revolve the main gear 16 thereof twenty-three times in order to revolve once the main drive wheel 15 which may be drivably connected to barrel 3 in any suitable manner as by means of splines. This gear 16 is provided with a hub 17 in which is a bushing 18 and which is free to rotate on the central shaft 19. This shaft which is in alinement with the shaft 8 of the transmission is mounted at its right hand end in the cover plate 20, through a ball bearing, and at its left hand end in a bushing 21 which fits snugly in the bore of the hub of the internal gear wheel 15. This hub carries two slots which receive two pins 22 driven into the shaft 19. The planetary gear assembly comprises, in addition to the gear 16, a set of preferably three planetary gear units, each of which consists of a hub 23 having a gear 24 cut thereon at one end and a gear 25 at the other end, the number of teeth of gear 24 being less than that of gear 25. Three equidistant openings are preferably provided in the web of gear 16, through each of which extends one of such units. Each unit is mounted in place by means of a bolt 26 passing transversely through parallel spider plates 27 and 28. These plates are spaced apart by bolts 29 and collars or separators 30. The set of gears 25 cooperate with a stationary internal gear 31 secured to the cover plate 20 and preferably having a somewhat greater number of teeth than the gear 15.

The shaft 19 is provided at its outer or right hand end with a bevel pinion 32 and the same is adapted to be driven by the manually operated means which are contained within the supplemental casing 33 detachably secured to the cover plate 20 of the main casing. Within this casing 33 and an end cap 34 secured thereto, is a hand cranking shaft 35 projecting extraneous of the cap and provided with suitable crank engaging means, such as the pin 36 with which an ordinary hand crank will cooperate. The cranking shaft is provided at its inner end within the casing 33 with a bevel gear 37 meshing with gear 32. When the cranking shaft 35 is rotated, the shaft 19 will thereby be rotated and consequently the torque will be transmitted through the planetary gearing to an inertia member or flywheel to be more particularly described hereafter, the energy stored in said flywheel being transmitted back through the drive or transmission to the engine member, after the drive has been put into engagement with such crank shaft in the manner hereinafter described.

The prime mover which is here in the form of an electric motor 38 is detachably connected to the main casing 1 and cover plate 20 in suitable manner as by means of bolts 39, and the armature shaft is provided with a bevel gear 40 meshing with gear 16, so that when the motor is energized, the torque will be transmitted through the planetary gearing and through the drive to the engine when such drive is operatively connected therewith in the manner hereinafter explained.

Referring to the inertia means the main casing 1 is provided on one side with an opening over which is placed an extension casing 41 and a plate 42, the same being secured to the main casing by screws 43. This plate is provided centrally with a ball bearing 44 and the outer wall of casing 41 is provided with a similar bearing 45. In these bearings is journaled a shaft 46 to which is splined a flywheel 47 and which is provided at its inner end with a bevel pinion 48 meshing with the large bevel gear 16, whereby when the planetary gearing is operated the flywheel is rotated at high speed. This casing 41 forms the outer bearing for the shaft 46 and also an enclosure for the flywheel. Any desired ratio of reduction may be employed. In the present instance, with respect to the motor drive, the reduction is 1 to 1, and consequently the motor speed and the flywheel speed will be the same, and in respect to the manual drive the reduction is approximately 100 to 1, that is the flywheel will be rotated 100 times to one rotation of the cranking shaft 35.

When the apparatus is operated by either hand or power, all of the mechanism described will be put into rotation including the flywheel 47 and when a sufficient speed of flywheel has been obtained from the driving power, that is either hand or motor, the drive or transmission is then put into engagement with the engine whereupon the energy stored up in the flywheel and the connecting parts is applied to the engine for the purpose of cranking the same. At such time the motor may be de-energized or may be left energized to effect continued cranking after the energy of the inertia means has been expended. The means for so placing the drive into engagement with the engine comprises the following parts:

The nut 13 which is threaded to the inner end of the screw shaft 8 and which serves as a stop for such shaft by striking against the face of the gear wheel 15, has a flanged portion 49 at the center of which is a tapped hole. The purpose of such flange and hole is to provide a means for assembling the threaded inner end 50 of the operating rod 51 such that this rod may be screwed all the way through the hole after which the drive assembly may be mechanically held out of mesh with the engine by means of such rod 51. The connection between this rod and nut is such as to permit the rod to swivel with respect to the nut, thereby eliminating any tendency on the part of either one to bind the other. This rod 51 extends longitudinally through the shaft 19 and across the casing 33 and through a side opening in the latter where it projects within convenient reach of the operator; the same terminating in a knob 52 and being held normally retracted by a coil spring 53 thereby normally holding the drive in inoperative position. If it is desired to dispense with the motor, the same is made readily detachable and when removed the opening into the main casing is closed by a cover plate 54.

Describing the operation of the starter first as motor operated, the motor is energized and the armature shaft and flywheel are brought up to speed, the drive being now out of engagement with the engine. When the desired speed has been attained and sufficient energy has been stored up in the flywheel, the circuit between the motor and battery is broken and the operating rod 51 is pushed inwardly towards the engine, thereby advancing the shaft 8. As soon as the splined end 11 thereof engages with the internal splines of the crank shaft, no further manual pushing of the rod 51 is necessary inasmuch as the screw threads will draw the shaft into mesh. As soon as the engine starts on its own power, the drive is automatically thrown out of engagement. If the engine should not start before the flywheel comes to rest, the screw shaft of the drive is automatically withdrawn from mesh with the engine by the spring 53, thus placing the apparatus in condition for another start.

If it is desired to bring the flywheel up to speed manually, an ordinary hand crank is applied to the cranking shaft 35 and the flywheel is brought up to speed by manual operation and the operating rod 51 is thereupon operated in the manner and with the result above explained.

In Fig. 5 I have shown an apparatus modified with respect to the location of the flywheel which is here associated directly with the motor. The armature shaft of the motor is extended at its outer end beyond its frame and provided with a flywheel 55 which for purposes of compactness and economy of space is made as shown in Fig. 5 wherein it is seen that such flywheel has a central bore encompassing the outer end of the motor frame, such flywheel being preferably splined to the armature shaft through the medium of the web 56 thereof which as shown is located at one end of the flywheel. The operation and result are the same as described in connection with the preferred form of apparatus.

I claim:

1. An engine starter including a driving member adapted to engage and crank a member of the engine to be started, a rotatable member for actuating such driving member, a manually operated means and power means operably connected with such rotatable member for driving of the rotatable member by either of such two means or by both combined, an inertia device cooperating with such rotatable member, and means for causing engagement between the driving member and the engine member.

2. An engine starter including a driving member adapted to engage and crank a member of the engine to be started, a rotatable member for actuating such driving member, a manually operated means and power means operably connected with such rotatable member for driving of the rotatable member by either of such two means or by both combined, a fly wheel acting as an inertia device and adapted to be brought up to speed by the operation of the manual means or the power means, and means for causing engagement between the driving member and the engine member.

3. An engine starter including a driving member adapted to engage and crank a member of the engine to be started, a rotatable member for actuating such driving member, reduction gearing operatively connected with the rotatable member, inertia means operatively connected with the reduction gearing, means for operating the reduction gearing either manually or by power or both, and means for causing engagement between the driving member and the engine member.

4. An engine starter including a driving member adapted to engage and crank a member of the engine to be started, a rotatable member for actuating such driving member, reduction gearing operatively connected with the rotatable member, a rotatable flywheel acting as an inertia device and operatively connected with and driven by the reduction gearing, and means for operating the reduction gearing either manually or by power or both, and means for causing engagement between the driving member and the engine member.

5. An engine starter including a driving member adapted to engage and crank a member of the engine to be started a rotatable member for actuating such driving member, reduction gearing operatively connected with the rotatable member, inertia means operatively connected with the reduction gearing, an electric motor and a manually operated means, each operatively connected with the reduction gearing, and means for causing engagement between the driving member and the engine member.

6. An engine starter including a driving member adapted to engage and crank a member of the engine to be started, a rotatable member for actuating such driving member, a manually operated means and power means detachably operably connected with such rotatable member for driving of the rotatable member by either of such two means or by both combined, an inertia device cooperating with such rotatable member, means for causing engagement between the driving member and the engine member, and means for withdrawing such driving member from the engine member in the event that the engine fails to start.

7. An engine starter including a driving member adapted to engage and crank a member of the engine to be started, a rotatable member for actuating such driving member, a manually operated means and power means detachably operably connected with such rotatable member for driving of the rotatable member by either of such two means or by both combined, an inertia device cooperating with such rotatable member, means for causing engagement between the driving member and the engine member, and a spring cooperating with the driving member for withdrawing it from the engine member in the event that the engine fails to start.

8. An engine starter including a driving member adapted to engage and crank a member of the engine to be started, a rotatable member for actuating such driving member, reduction gearing axially aligned with and operatively connected with the rotatable member, a main casing concentric with and enclosing such driving and rotatable members and the reduction gearing, an extension casing on one side of the main casing and having its axis at right angles thereto, an inertia device mounted in and enclosed by such extension casing coaxially therewith and operatively connected with the reduction gearing means for operating such gearing either manually or by power or both, and means for causing engagement between the driving member and the engine member.

9. An engine starter including a driving member adapted to engage and crank a member of the engine to be started, a rotatable member for actuating such driving member, reduction gearing operatively connected with the rotatable member, a main casing enclosing such driving and rotatable members and the reduction gearing, an extension casing on one side of the main casing, a flywheel acting as an inertia device and mounted to rotate within such extension casing and operatively connected with the reduction gearing, means for operating such gearing either manually or by power or both, and means for causing engagement between the driving member and the engine member.

10. An engine starter including a driving member adapted to engage and crank a member of the engine to be started, a rotatable member for actuating such driving member, reduction gearing axially aligned with and operatively connected with the rotatable member, a main casing concentric with and enclosing such driving and rotatable members and the reduction gearing, an extension casing on one side of the main casing and having its axis at right angles thereto, a plate between the extension casing and the main casing, a flywheel acting as an inertia device and journalled on said plate and extension casing coaxially with the latter and operatively connected with the reduction gearing, means for operating such gearing either manually or by power or both, and means for causing engagement between the driving member and the engine member.

11. An engine starter including a driving member adapted to engage and crank a member of the engine to be started, a rotatable member for actuating such driving member, reduction gearing which is operatively connected with said rotatable member, an inertia device, an electric motor, said device and motor being operatively connected with the same member of the reduction gearing, manually operated means operatively connected with said rotatable member and to said reduction gearing, and means for causing engagement between the driving member and the engine member.

12. An engine starter including a driving member adapted to engage and crank a member of the engine to be started, a rotatable member for actuating such driving member, reduction gearing which is operatively connected with said rotatable member, a flywheel acting as an inertia device and having a shaft, an electric motor, said flywheel shaft and motor being geared to the same member of the reduction gearing, manually operated means operatively connected with said rotatable member and to said reduction gearing, and means for causing engagement between the driving member and the engine member.

13. An engine starter including a driving member adapted to engage and crank a member of the engine to be started, a rotatable member for actuating such driving member, reduction gearing which is operatively connected with said rotatable member, and which includes a main gear wheel, a second gear wheel connecting between the main gear wheel and the rotatable member, an inertia device, an electric motor, said device and motor being both geared to said main gear wheel, manually operated means operatively connected with said second gear wheel, and means for causing engagement between the driving member and the engine member.

14. An engine starter including a driving member adapted to engage and crank a member of the engine to be started, a rotatable member for actuating such driving member, reduction gearing which is operatively connected with said rotatable member, and which includes a main gear wheel, a second gear wheel connecting between the main gear wheel and the rotatable member, a flywheel acting as an inertia device and having a shaft, an electric motor, said flywheel shaft and motor being geared to said main gear wheel, manually operated means operatively connected with said second gear wheel, and means for causing engagement between the driving member and the engine member.

15. An engine starter including a driving member adapted to engage and crank a member of the engine to be started, a rotatable member for actuating such driving member, reduction gearing which is operatively connected with said rotatable member, and which includes a main gear wheel, a second gear wheel connecting between the main gear wheel and the rotatable member, a flywheel acting as an inertia device and having a shaft, a pinion on said shaft, an electric motor having a shaft, a pinion on the motor shaft, said two pinions being of substantially the same size and both meshing with said main gear wheel whereby a 1 to 1 gear ratio exists between the motor and the flywheel shaft, manually operated means operatively connected with said second gear wheel whereby an increased gear ratio exists between the manual means and the flywheel shaft.

16. An engine starter including a driving member adapted to engage and crank a member of the engine to be started, a rotatable member for actuating such driving member, reduction gearing which is operatively connected with said rotatable member, an inertia device, an electric motor, said device and motor being operatively connected with the same high-speed member of the reduction gearing, manually operated means operatively connected with said rotatable member and to a low-speed member of said reduction gearing, and means for causing engagement between the driving member and the engine member, said manually operated means including a cranking shaft, a main driving shaft operatively connected thereto, a gear wheel operatively connected with said main shaft and with said reduction gearing and also with said rotatable member.

17. An engine starter including a driving member adapted to engage and crank a member of the engine to be started, a rotatable member for actuating such driving member, reduction gearing which is operatively connected with said rotatable member, an inertia device, an electric motor, said device and motor being operatively connected with the same high-speed member of the reduction gearing, manually operated means operatively connected with said rotatable member and to a low-speed member of said reduction gearing, and means for causing engagement between the driving member and the engine member, said manually operated means including a cranking shaft, a main driving shaft operatively connected thereto, a gear wheel operatively connected with said main shaft and with said reduction gearing and also with said rotatable member, said reduction gearing as an assembly being mounted to rotate freely upon said main shaft.

18. An engine starter including a driving member adapted to engage and crank a member of the engine to be started, a rotatable member for actuating such driving member, a manually operated means and power means operably connected with such rotatable member for driving of the rotatable member by either of such two means or by both combined, an inertia device cooperating with such rotatable member for applying its energy thereto, and means for causing engagement between the driving member and the engine member, said latter means being manually operable.

19. An engine starter including a driving member adapted to engage and crank a member of the engine to be started, a rotatable member for actuating such driving member, a manually operated means and power means operably connected with such rotatable member for driving of the rotatable member by either of such two means or by both combined, an inertia device cooperating with such rotatable member, and means for causing engagement between the driving member and the engine member, said latter means including a rod coaxial with and operatively connected with said driving member for shifting the latter into engagement with the engine member.

20. An engine starter including a driving member adapted to engage and crank a member of the engine to be started, a rotatable member for actuating such driving member, a manually operated means and power means operably connected with such rotatable member for driving of the rotatable member by either of such two means or by both combined, an inertia device cooperating with such rotatable member, and means for causing engagement between the driving member and the engine member, said latter means including a normally operable rod coaxial with and having a swivel connection with said driving member for shifting the latter into engagement with the engine member.

21. An engine starter including a driving member adapted to engage and crank a member of the engine to be started, a rotatable member for actuating such driving member, a manually operated means and power means operably connected with such rotatable member for driving of the rotatable member by either of such two means or by both combined, an inertia device cooperating with such rotatable member, and means for causing engagement between the driving member and the engine member, said latter means including a rod having a swivel connection with said driving member for shifting the latter into engagement with the engine member, said driving member including at one end a nut having a tapped hole through which the inner end of said rod is threaded.

22. An engine starter including a driving member forwardly shiftable to engage and rotatable to crank a member of the engine to be started, a rotatable member for actuating such driving member, means between said two members for automatically shifting said driving member retractively only, a manually operated means and power means operably connected with such rotatable member for driving of the rotatable member by either of such two means or by both combined, an inertia device cooperating with such rotatable member, and means for causing engagement between the driving member and the engine member, said latter means including a part operatively connected with said driving member for shifting the latter into engagement with the engine member, and yielding means acting to resist said shifting movement and tending to retract said part and driving member after operation thereof.

23. An engine starter including a driving member forwardly shiftable to engage and rotatable to crank a member of the engine to be started, a rotatable member for actuating such driving member, means between said two members for automatically shifting said driving member retractively only, a manually operated means and power means operably connected with such rotatable member for driving of the rotatable member by either of such two means or by both combined, an inertia device cooperating with such rotatable member, and means for causing engagement between the driving member and the engine member, said latter means including a part operatively connected with said driving member for shifting the latter into engagement with the engine member, and a spring cooperating with said part and tending to retract the same after its operation.

24. An engine starter including a driving member adapted to engage and crank a member of the engine to be started, a rotatable member for actuating such driving member, reduction gearing which is operatively connected with said rotatable member, an inertia device, an electric motor, said device and motor being operatively connected with the same member of the reduction gearing, manually operated means operatively connected with said rotatable member and to said reduction gearing, and means for causing engagement between the driving member and the engine member, and including a rod operatively connected with said driving member, said manually operated means including a main driving shaft which is in axial alinement with said driving member and which is provided with a central bore through which said rod extends.

25. An engine starter including a driving member adapted to engage and crank a member of the engine to be started, a rotatable member for actuating such driving member, reduction gearing which is operatively connected with said rotatable member, an inertia device, an electric motor, said device and motor being operatively connected with the same member of the reduction gearing, manually operated means operatively connected with said rotatable member and to said reduction gearing, and means for causing engagement between the driving member and the engine member, and including a rod operatively connected with said driving member, said manually operated means including a main driving shaft which is in axial alinement with said driving member and which is provided with a central bore through which said rod extends, said driving member being threaded to the rotatable member by long lead threads whereby when said rod is operated the driving member is shifted and advanced into engagement with the engine with a helical movement.

26. An engine starter including a driving member adapted to crank a member of the engine to be started, a rotatable member concentric therewith for actuating such driving member, reduction gearing concentric with and operatively connected with the rotatable member, a main casing of generally circular section concentric with and enclosing such driving and rotatable member and reduction gearing, a generally cylindrical extension casing on one side of and at right angles to the main casing, a flywheel acting as an inertia device and mounted to rotate within such extension casing and operatively connected with the reduction gearing and means for operating such gearing.

27. An engine starter including a driving member adapted to crank a member of the engine to be started, a rotatable member for actuating such driving member, means for driving such rotatable member, including a hollow shaft aligned with the driving member, an inertia device co-operating with such rotatable member, and means for causing engagement between the driving member and engine member comprising a rod passing through said hollow shaft and longitudinally movable and physically independent of and operatively connected with said driving member whereby the latter is caused to engage the engine member.

28. An engine starter including a driving member adapted to crank a member of the engine to be started, a rotatable member for actuating such driving member, means for driving such rotatable member, including a hollow shaft aligned with the driving member, an inertia device co-operating with such rotatable member, and means for causing engagement between the driving member and engine member comprising a longitudinally movable rod passing through said hollow shaft and operatively connected with said driving member whereby the latter is caused to engage the engine member, said rod having a swivel connection with the driving member.

29. An engine starter including a driving member adapted for advancement to engage and rotation to crank a member of the engine to be started, a rotatable member for rotating such driving member, having connection therewith for automatic retraction thereof only, means for driving such rotatable member, an inertia device co-operating with such rotatable member, and means for causing engagement between the driving member and engine member comprising a longitudinally movable rod operatively connected with said driving member whereby the latter is caused to engage the engine member, said rod being yieldingly restrained from advancing movement.

30. An engine starter including a driving member adapted to crank a member of the engine to be started, a rotatable member for actuating such driving member, reduction gearing operatively connected with the rotatable member, an inertia device cooperating with such gearing, means for actuating the gearing, and means for causing engagement between the driving member and the engine member including a rod operatively connected with said driving member, said gear actuating means including a driving shaft which is in axial alinement with the driving member and which is provided with a bore receiving said rod.

31. An engine starter including a driving member adapted to crank a member of the engine to be started, means for actuating such driving member including reduction gearing having a shaft, which is in alinement with said driving member and which is provided with a central bore, and a rod received by said bore and operatively engaging the driving member to cause its engagement with the engine member.

32. An engine starter including a driving member in the form of a shaft mounted for longitudinal movement to engage a member of the engine to be started and for rotary movement to then crank such engine, means for actuating such driving shaft including reduction gearing having a shaft which is in alinement with said driving shaft and which is provided with a central bore, and a rod received by said bore and operatively engaging the driving member to cause its engagement with the engine member.

33. An engine starter including a driving member adapted to engage and crank a member of the engine to be started, a rotatable member for actuating such driving member, an inertia device, a train of driving connections for driving said inertia device, and a driven connection between an intermediate part of such train and said rotatable member including a clutch, said driving member having a separate clutch to engage the engine member.

34. An engine starter including a driving member adapted to engage and crank a member of the engine to be started, a rotatable member for actuating such driving member, an inertia device, a train of driving connections for driving said inertia device, and a driven connection between an intermediate part of such train and said rotatable member including a yieldable clutch, said driving member having a separate clutch to engage the engine member.

35. An engine starter including a driving member adapted to engage and crank a member of the engine to be started, a rotatable member for actuating such driving member, an inertia device, a train of driving connections for driving said inertia device, and a driven connection between an intermediate part of such train and said rotatable member including a friction clutch, said driving member having a separate clutch to engage the engine member.

36. An engine starter including a driving member adapted to engage and crank a member of the engine to be started, a rotatable sleeve operatively connected with the driving member for actuating it, a rotatable barrel outside of and concentric of the sleeve, a yieldable clutch forming the driving connection between such barrel and sleeve, an inertia device, a train of driving connections for driving said inertia device, said barrel being operatively connected with said train at an intermediate point, and means for causing engagement between the driving member and the engine member.

37. An engine starter including a driving member adapted to engage and crank a member of the engine to be started, a rotatable sleeve operatively connected with the driving member for actuating it, a rotatable barrel outside of and concentric of the sleeve, a friction clutch forming the driving connection between such barrel and sleeve, an inertia device, manual operating means, and a train of driving connections for driving said inertia device from said manual means, said barrel and manual means being operatively connected with said train at an intermediate point.

38. An engine starter including a driving member adapted for advancement to engage and rotation to crank a member of the engine to be started, a rotatable sleeve operatively connected with the driving member for actuating it and coacting with said driving member to retract it only automatically, a rotatable barrel outside of and concentric of the sleeve, a friction clutch forming the driving connection between such barrel and sleeve, an inertia device, manual cranking means, and a train of driving connections for driving said inertia device from said manual means, said barrel and manual means being operatively connected with said train at an intermediate point, and means for advancing the driving member.

39. An engine starter including a driving member adapted to engage and crank a member of the engine to be started, a rotatable sleeve operatively connected with the driving member for actuating it, a rotatable barrel outside of and concentric of the sleeve, a yieldable clutch forming the driving connection between such barrel and sleeve, an inertia device, a train of gearing for driving said inertia device, which gearing is speed multiplying gearing in the direction towards the inertia device, said barrel being operatively connected with said train of gearing at an intermediate point, which gearing is reduction gearing in the direction from the inertia device.

40. An engine starter including a driving member adapted to engage and crank a member of the engine to be started, a rotatable sleeve operatively connected with the driving member for actuating it, a rotatable barrel outside of and concentric of the sleeve, a yieldable clutch forming the driving connection between such barrel and sleeve, an inertia device, a train of gearing for driving said inertia device, which gearing is speed multiplying gearing in the direction towards the inertia device, said barrel being operatively connected with said train of gearing at an intermediate point, which gearing is reduction gearing in the direction from the inertia device, manually operated means for driving the gearing at its low speed end, and an electric motor for driving the gearing at its high speed end.

41. An engine starter including a driving member adapted to engage and crank a member of the engine to be started, an inertia device, reduction gearing connected therewith, an electric motor for driving the gearing and inertia device, and operating connections between the gearing and the driving member.

42. An engine starter including a driving member adapted to engage and crank a member of the engine to be started, an inertia device, reduction gearing connected therewith, an electric motor for driving the gearing and inertia device, and operating connections between the gearing and the driving member including a yieldable clutch.

43. An engine starter including a driving member adapted to engage and crank a member of the engine to be started, an inertia device, reduction gearing connected therewith, an electric motor for driving the gearing and inertia device, and operating connections between the gearing and the driving member including a multiplate friction clutch.

44. An engine starter including a driving member adapted to engage and crank a member of the engine to be started, an inertia device, reduction gearing connected therewith, an electric motor for driving the gearing and inertia device, said motor being connected with the gearing at its high speed end, manually operated means connected with the gearing at its low speed end, and operating connections between the gearing and the driving member.

45. An engine starter including a driving member adapted to engage and crank a member of the engine to be started, an inertia device, reduction gearing connected therewith, an electric motor for driving the gearing and inertia device, said motor being connected with the gearing at its high speed end, manually operated means connected with the gearing at its low speed end, and operating connections between the low-speed end of gearing and the driving member including a multiplate friction clutch.

46. An engine starter including a driving member adapted to engage and crank a member of the engine to be started, an inertia device, means for actuating such inertia device, operating connections between such means and driving member and the inertia device, and a yieldable clutch located in such connections in proximity to said driving member to thereby protect substantially all of said connections in case of back fire of the engine.

47. An engine starter including a driving member adapted to engage and crank a member of the engine to be started, an inertia device, means for actuating such inertia device, operating connections between such means and driving member and the inertia device, and a friction clutch located in such connections in proximity to said driving member to thereby protect substantially all of said connections in case of back fire of the engine.

48. An engine starter including a driving member shiftable to engage and rotatable to crank a member of the engine to be started, an inertia device, reduction gearing of high order of reduction having its low-speed and high-speed ends respectively in operative association with said driving member and said inertia device, an electric starting motor coacting with said inertia device and gear train for one-to-one rotation with said inertia device, and means for shifting said driving member to engage said engine member.

49. An engine starter including a driving member shiftable to engage and rotatable to crank a member of the engine to be started, an inertia device, reduction gearing of high order of reduction having its low-speed and high-speed ends respectively in operative association with said driving member and said inertia device, an electric starting motor coacting with said inertia device and gear train for one-to-one rotation with said inertia device, means for automatic disengagement of said driving member from said engine member when the engine operates under its own power, means for shifting said driving member to engage said engine member, and a friction clutch arranged in the operative connections between said driving member and said reduction gearing adapted to slip on backfire of the engine to protect said gearing, inertia device and motor.

50. An engine starter including a driving member shiftable to engage and rotatable to crank a member of the engine to be started, an inertia device, reduction gearing of high order of reduction having its low-speed and high-speed ends respectively operatively associated with said driving member and said inertia device, an electric starting motor coacting with said inertia device and gearing for one-to-one rotation with said inertia device, means for automatic disengagement of said driving member from said engine member when the engine starts under its own power, means for shifting said driving member to engage said engine member, manual cranking means operatively associated with a relatively low-speed part of said reduction gearing, and a friction clutch interposed in the operative connections between such part of said gearing and said driving member.

51. An engine starter including a rotatable driving element, a driving member operatively connected therewith for rotary movement therewith and longitudinal movement thereof into engagement with a member of the engine to be started, a rotatable engine member, said driving member and said engine member having automatic means of disengagement when the engine operates under its own power, reduction gearing operatively connected with the driving element and including a hollow shaft aligned with and in rear of said driving member and a manually operated rod passing through said hollow shaft and operatively engaged with said driving member.

RAYMOND P. LANSING.